United States Patent [19]
Goldstein

[11] Patent Number: 5,357,367
[45] Date of Patent: Oct. 18, 1994

[54] SPYHOLE VIEWER

[76] Inventor: Pinchas Goldstein, 59 Shaulzon Street, Jerusalem, Israel

[21] Appl. No.: 968,525

[22] Filed: Oct. 29, 1992

[30] Foreign Application Priority Data

Nov. 1, 1991 [IL] Israel ..................... 099941

[51] Int. Cl.⁵ ............................. G02B 3/08
[52] U.S. Cl. ..................... 359/400; 359/431; 359/504
[58] Field of Search ............. 359/400, 431, 504, 742, 359/744, 894

[56] References Cited

U.S. PATENT DOCUMENTS

| | | | |
|---|---|---|---|
| 3,145,249 | 8/1964 | Meltzer | 359/504 |
| 3,251,262 | 5/1966 | Ellenberger | 359/557 |
| 3,434,773 | 3/1969 | Pitchford . | |
| 3,910,676 | 10/1975 | Fojtik et al. . | |
| 3,973,835 | 8/1976 | Miyakawa et al. . | |
| 4,082,434 | 4/1978 | Hayashi et al. . | |
| 4,251,127 | 2/1981 | Yamaguchi . | |
| 4,257,670 | 3/1981 | Legrand . | |
| 4,269,474 | 5/1981 | Kamimura . | |
| 4,348,083 | 9/1982 | Kamimura . | |
| 4,431,277 | 2/1984 | Lewandowski . | |
| 4,561,116 | 12/1985 | Neyret . | |
| 4,688,905 | 8/1987 | Okamura | 359/742 |
| 4,726,670 | 2/1988 | Sherrard . | |
| 4,730,911 | 5/1988 | Wood et al. . | |
| 4,869,021 | 9/1989 | Gregory . | |
| 4,892,399 | 1/1990 | Ahn . | |
| 4,964,711 | 10/1990 | Degnan . | |
| 5,157,553 | 10/1992 | Phillips et al. | 359/744 |

FOREIGN PATENT DOCUMENTS

| | | | |
|---|---|---|---|
| 0182323 | 9/1963 | Sweden | 359/431 |
| 0913894 | 12/1962 | United Kingdom | 359/400 |
| 0971867 | 10/1964 | United Kingdom | 359/894 |
| 86/01908 | 3/1986 | World Int. Prop. O. | 359/504 |

*Primary Examiner*—Edward K. Look
*Assistant Examiner*—Mark Sgantzos
*Attorney, Agent, or Firm*—Sandler Greenblum & Bernstein

[57] ABSTRACT

A spyhole viewer, mountable in a wall surface is disclosed and provides a wide angle view, while requiring a small diameter mounting hole. An objective lens system produces a real inverted image, a reflector angularly deflects light from the objective lens system, and an erector, located behind an element of objective lens system, erect the image. Further, a image surface upon which the image will appear, and a projection viewing lens are provided. The image optical axis is angularly deflected at least once between the objective and viewing lens systems.

18 Claims, 2 Drawing Sheets

SPYHOLE VIEWER

BACKGROUND OF THE INVENTION

The present invention relates to a spyhole viewer mountable in doors, walls, etc.

Such viewers are known, in particular from U.S. Pat. Nos. 4,726,670 and 4,892,399. These viewers are superior to earlier spyhole devices inasmuch as both have optics that produce real, projectable images which can be observed from some distance, as distinct from the earlier devices that produced virtual images which required the user's eye to be close to the eyepiece.

Yet both of the above prior-art viewers suffer from disadvantages that reduce their usefulness. Both devices, and in particular the device described in U.S. Pat. No. 4,892,399, require large holes to be provided in the door, in the case of the latter even a stepped, two-diameter hole very difficult to produce and certainly unsuitable for do-it-yourself installation, with retrofitting, starting out from an existing, relatively small bore being a very tricky business even for an expert. A further disadvantage of this disclosure is the use of what is, in fact, a double Dove prism 9, 9' used as an erector element at the entrance pupil of its optics, in spite of the well-known rule that Dove prisms should only be used with bundles of parallel light beams (which in this system is obviously not the case), as otherwise aberrations will be introduced.

The viewer according to U.S. Pat. No. 4,726,670 has several more disadvantages. Its optical system is clearly not a wide-angle system, very important for this sort of application, and in both disclosures the efficiency of their ground-glass screen is severely compromised by its being exposed to ambient light, which greatly reduces contrast.

A further drawback is common to both disclosures: The orientation of the optical axis of the system is fixed. For closer viewing, this forces taller users to stoop, while users of smaller stature may have to stand on their toes and even when viewing the screen from a larger distance, truly satisfactory results are obtained only when the diffusing screen is viewed in a direction more or less perpendicular thereto.

SUMMARY OF THE INVENTION

It is one of the objects of the present invention to provide a wide-angle spyhole viewer that fits a relatively small hole produceable by a standard spiral drill. It is a further object of the invention to provide a viewer that uses non-distorting erector elements and protects its image screen from incident light and that permits the optical axis of the viewing side of the device to be tilted to best accommodate the individual user.

According to the invention, this is achieved by providing a spyhole viewer for a door or wall, comprising an objective system for producing a real, inverted image and mounted in a tubular member fixedly installable in said door or wall; at least one reflector means for angularly deflecting the light beams from said objective system; erector means for inverting said inverted image and located behind at least one element of said objective system; an image surface upon which said real image will appear; a housing fixedly attachable to said tubular member and accommodating at least said reflector means and a projection viewing lens mounted therein in coaxiality with said optical axis as deflected by said reflector means, characterized in that, on its way from said optical system to said viewing lens, said optical axis is angularly deflected at least once.

The invention will now be described in connection with certain preferred embodiments with reference to the following illustrative figures so that it may be more fully understood.

BRIEF DESCRIPTION OF THE DRAWING

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENT

Figure 1:
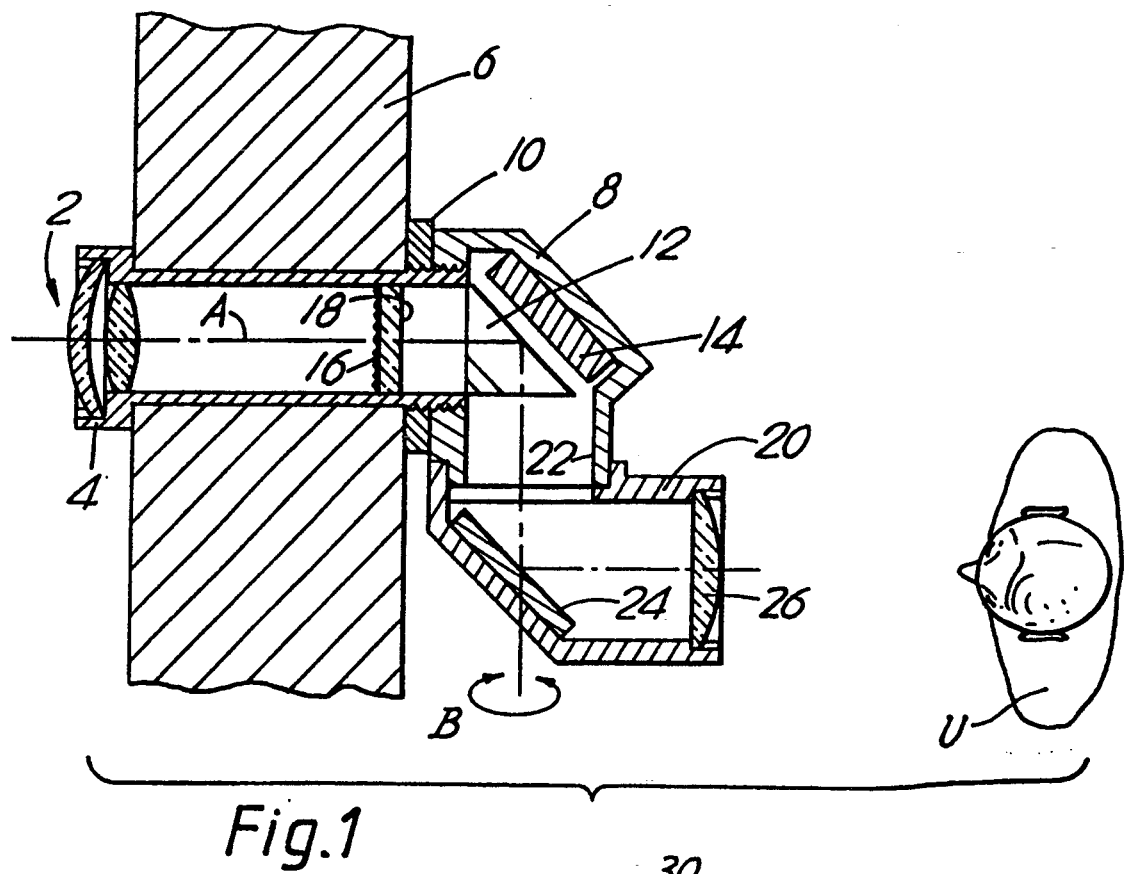
FIG. 1 is a top view, in cross section, of a first embodiment of the viewer according to the invention.

Referring now to the drawings, there is seen in FIG. 1 a multilens objective system 2 mounted in a tubular member 4 which is inserted into a bore in the door 6. Due to the fact that the narrow portion of the bundle of light rays entering through, and passing, the optical system 2, is located within the thickness of the door, permits the use of a half-inch bore that has long been the standard bore for spyholes. The advantages of such a relatively small bore, produceable with a standard spiral drill, are obvious. The first part 8 of a two-part housing is attached to the threaded end of the tubular member 4 and locked in position by a ring 10. This housing part 8 accommodates an erector prism 12 of the Amici type and a bullet-proof armor plate 14 for preventing any hard object from being forcibly introduced into the room through the tubular member 4.

Inside the tubular member 4, at an appropriate distance from the objective system 2, there is mounted a contrast-improving yet non-distorting Fresnel lens 16, the rear surface 18 of which is ground to form a diffusive screen on which materializes the real, inverted image produced by the objective system 2.

The second housing part 20 is attached to the collar-like edge 22 of the first housing part 8 in a way that permits it to tilt about the optical axis A (after deflection by the erector prism 12) as indicated by the double arrow B. The purpose of this tiltability will be explained further below.

The second housing part 20 accommodates a reflecting mirror 24 which deflects the optical axis A for a second time and directs it towards a projection (or viewing) lens 26, which is mounted coaxially with the optical axis, as illustrated in FIG. 1, through which the now erect image can be viewed by the user U, who may use both eyes. The combination of the Fresnel lens 16, its diffusing back (or rear) surface 18 protected from incident light and the projection lens 26 permit the image to be usefully viewed also from a considerable distance, while also preventing the room and any person or persons present in it to be observed from the outside of the door. For best viewing, the line of sight of the user U should be perpendicular to the general plane of the viewing or projection lens 26. This becomes more important the closer one approaches the projection lens, e.g., to observe details. The above-mentioned tilting feature allows easy adjustment to the individual height of the user.

Figure 1A:
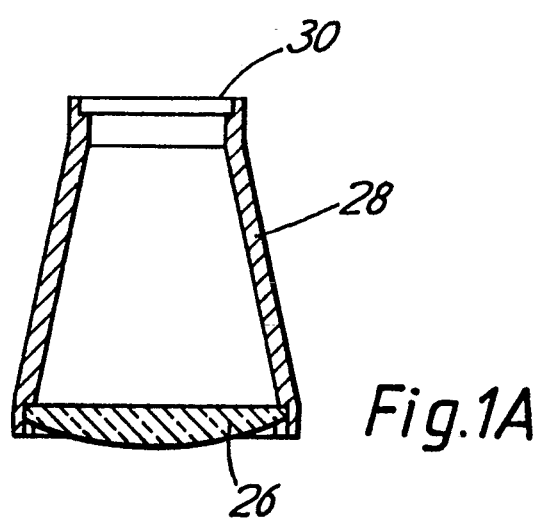
FIG. 1A is a cross-sectional view of a tubular body carrying a viewing lens and attachable to the first housing part, replacing the second housing part in a variant of the embodiment of FIG. 1.

In a variant of this embodiment, conveniently used in narrow corridors with doors located along one of the lateral walls, the second housing part 20 with its deflecting mirror 24 is replaced by a tubular body 28 (FIG. 1A) attachable with its open rim 30 to the above-mentioned collar-like edge 22 of the first housing part 8 and mounting the viewing lens 26. In this embodiment, the optical axis A is deflected only once (by the erector 12), enabling the viewer to observe the corridor from the side of the door. While this embodiment does not have the tiltability feature, an embodiment can be envisaged in which the tubular body will be tiltable, too, for instance by making the housing 8 rotatable about the axis of the tubular member 4.

Figure 2:
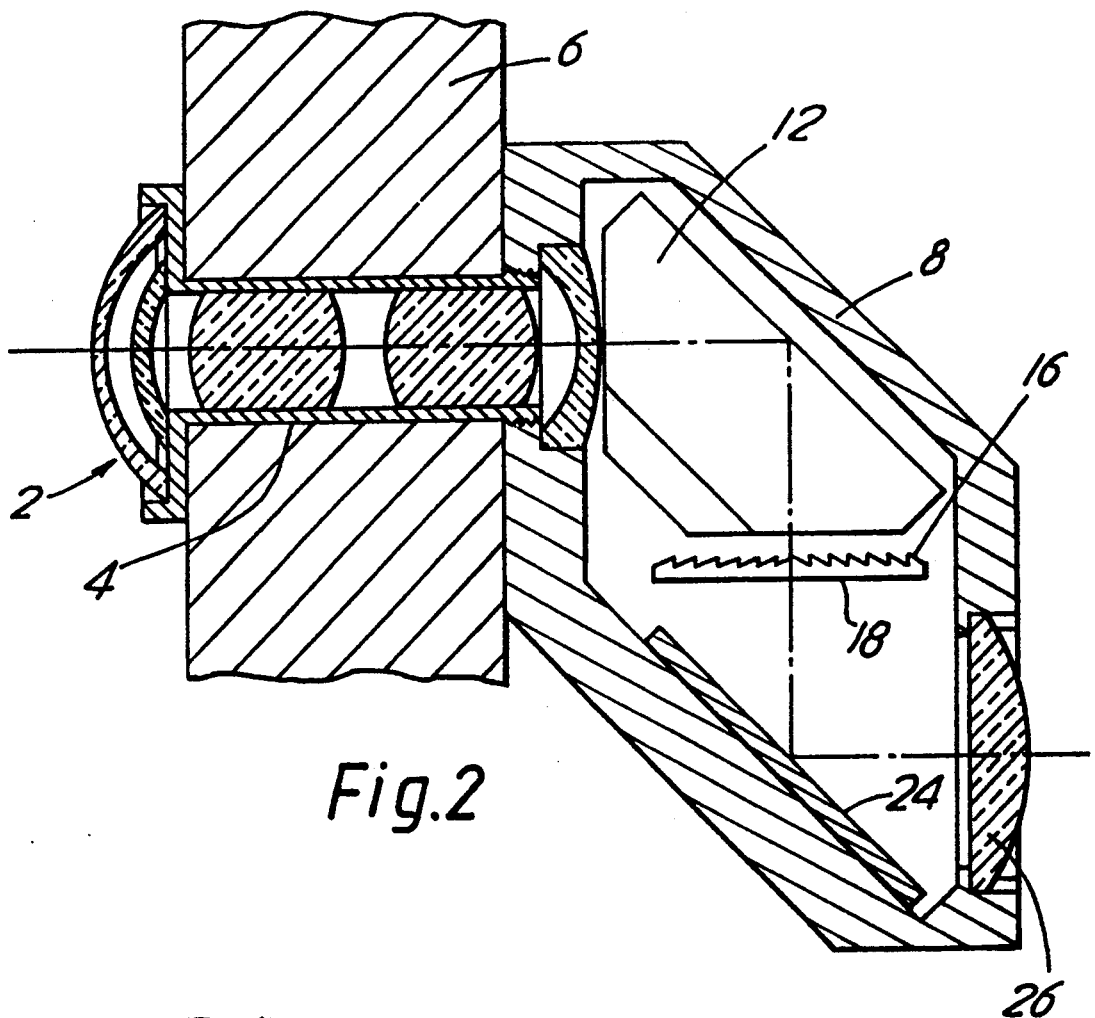
FIG. 2 is a top view, in cross section, of a second embodiment of the viewer according to the invention.

The embodiment of FIG. 2 has a more elaborate objective system, affording an even wider viewing angle (over 100°). The Fresnel lens 16 is now located after the erector 12. The multi-lens objective system 2 in FIG. 2 differs from that in FIG. 1 by the fact that, in addition to the wide field imaging, it also has the ability to produce the image at a considerable distance from the last component (i.e. long back focal length), while retaining a narrow waist in order to keep the hole in the door small.

The multi-lens optical system was designed to achieve the features of being mountable in a narrow hole in the door, having long back focal length, and providing a wide field of view.

The multi-lens objective system 2, shown in FIG. 1, includes a meniscus negative singlet lens and a thick positive double-convex lens.

The multi-lens objective system 2, shown in FIG. 2, includes a meniscus negative singlet lens, two thick positive double-convex lens and another negative meniscus lens used as a field lens.

The projection lens 26 has two main advantages.

a) It allows the viewer to recognize faces and fine details even when he watches the image at a large distance (about 5 meters) from the spyhole. This feature is achieved by keeping a low degradation of the angular size of the image, while the viewer becomes farther away from the device.

b) Another important advantage of using the projection lens is improving the contrast of the image. Using the projection lens to watch the image allows the shading of the diffusion screen 16, and prevents any background illumination from reaching it. This improves the contrast of the image by keeping the dark areas in the image black.

Figure 3:
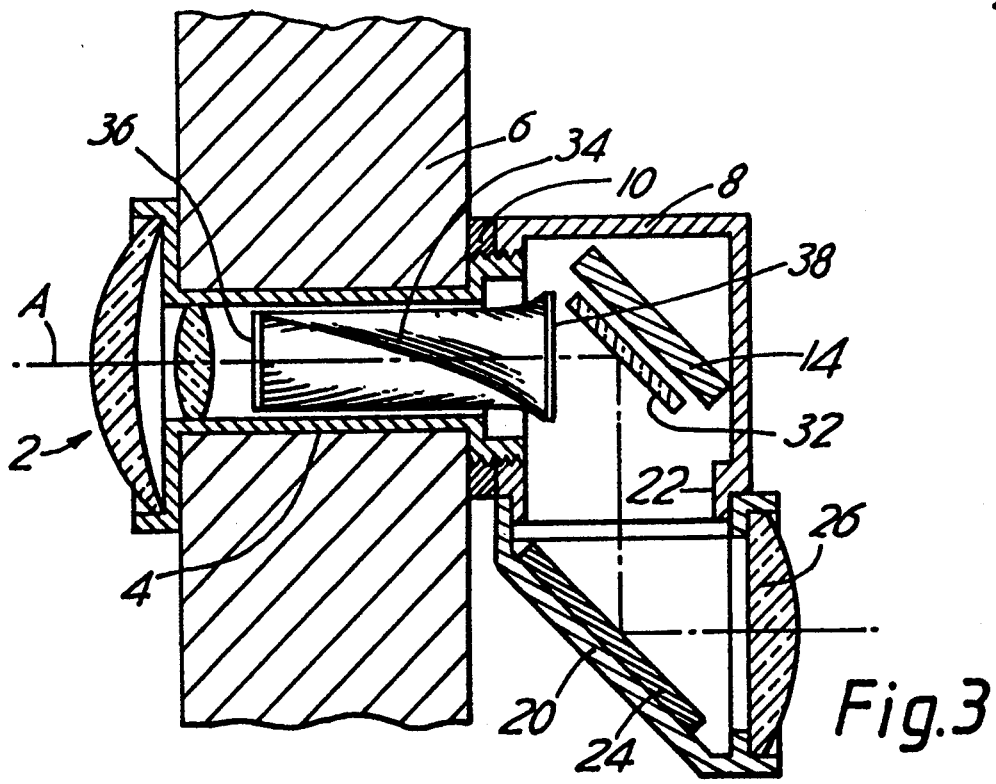
FIG. 3 is a similar view of yet another embodiment, in which the erector is in the form of a bundle of optical fibers.

In the embodiment of FIG. 3, the erector element is a bundle of coherent optical fibers 34 which has been given a twist of 180°. Thus the image elements entering the bundle at its front end face 36 exit it at its rear end face 38, producing a real, erect image which is reflected by the reflector 32 onto the reflector 24 and thence through the viewing lens 26. The optical axis A is thus deflected twice, as in the embodiments of FIGS. 1 and 2.

For improved contrast, a Fresnel lens can be added to the rear end 38 of the fiber bundle 34.

In a per se known manner, the fiber bundle 34 is used here also to enlarge the image by spreading the end points of the fibers over a larger surface—compare the two faces 36 and 38—or by using tapering fibers. By making the bundle 34 longer and flexing it by 90°, it could also be used to deflect the optical axis A, dispensing with the reflector 32.

While roof-type prisms indeed give best results as erectors, fairly satisfactory service could also be obtained from a pair of mirrors arranged in a roof-like configuration.

For best results, all reflector mirrors should be first-surface mirrors. It should also be noted that at least some of the elements of the objective systems 2 could consist of aspherical lenses.

It should be understood that the above-explained tiltability feature is optional only and that the embodiments represented would also give valuable service without that feature.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A spyhole viewer for a door or wall, comprising:
   an objective system for producing a real, inverted image and mounted in a tubular member fixedly installable in said door or wall;
   at least one reflector means for angularly deflecting the light beams from said objective system;
   erector means for inverting said inverted image and located behind at least one element of said objective system;
   an image surface upon which said real image will appear;
   a housing fixedly attachable to said tubular member and accommodating at least said reflector means and a projection lens mounted therein in coaxiality with said optical axis as deflected by said reflector means,
   characterized in that, on its way from said objective system to said projection lens, said optical axis is angularly deflected at least once.

2. The spyhole viewer as claimed in claim 1, wherein said objective system is a multi-element wide-angle system.

3. The spyhole viewer as claimed in claim 1, wherein at least one element of said objective system is an aspherical element.

4. The spyhole viewer as claimed in claim 1, wherein said at least one reflector means is a plane mirror arranged to deflect said optical axis by at least approximately 90° and is mounted in said housing in proximity to said projection lens.

5. The spyhole viewer as claimed in claim 1, wherein said erector means is a prism-type erector mounted in said housing.

6. The spyhole viewer as claimed in claim 5, wherein said prism-type erector is an Amici roof prism.

7. The spyhole viewer as claimed in claim 1, wherein said erector means is a mirror-type erector mounted in said housing.

8. The spyhole viewer as claimed in claim 1, wherein said erector means is a coherent bundle of optical fibers, twisted by 180° and at least partly located and mounted in said tubular member.

9. The spyhole viewer as claimed in claim 1, wherein said image surface is in the form of a ground rear surface of a Fresnel lens.

10. The spyhole viewer as claimed in claim 8, wherein said image surface is constituted by a rear end face, remote from said objective system, of said coherent bundle of optical fibers.

11. The spyhole viewer as claimed in claim 9, wherein said Fresnel lens is mounted in said tubular member.

12. The spyhole viewer as claimed in claim 9, wherein said Fresnel lens is mounted in said housing.

13. The spyhole viewer as claimed in claim 1, further comprising a second reflector means mounted in said housing in proximity to said tubular member.

14. The spyhole viewer as claimed in claim 1, wherein said housing is a two-part housing, a first part of said housing, fixedly attachable to said tubular member, and a second part of said housing, said at least one reflector and said projection lens being accommodated in said second part of said housing, said second part of said housing being mounted for swivelling about an axis perpendicular to an axis of said tubular member.

15. The spyhole viewer as claimed in claim 14, said second part of said housing being replaceable by a tubular body attached at one of its ends to said first housing part and mounting, at its other end, an image-intensifying viewing lens.

16. The spyhole viewer as claimed in claim 1, further comprising an armor plate mounted inside said housing behind said tubular member.

17. The spyhole viewer as claimed in claim 1, wherein said image surface is constituted by a rear end face, remote from said objective system, of a bundle of coherent optical fibers comprising said erector means.

18. A spyhole viewer for a door or wall, said viewer comprising:

an objective optical system having at least one element for producing a real invented image, said objective optical system mounted in a tubular member fixedly installed in the door or wall;

at least one reflector for angularly deflecting light beams from said objective optical system;

an erector for inverting the inverted image produced by said objective optical system, said erector located behind said at least one element of said objective optical system;

an image surface upon which the real image produced by the objective optical system will appear; and a housing, fixedly attachable to said tubular member, said reflector and a projection lens being accommodated in said housing coaxially with the deflected optical axis of the light beams deflected by said reflector;

wherein the optical axis is angularly deflected at least once between said objective optical system and said projection lens.

* * * * *